United States Patent [19]

Stephens et al.

[11] Patent Number: 4,949,289

[45] Date of Patent: Aug. 14, 1990

[54] INTERPOLATION APPARATUS

[75] Inventors: W. F. Noel Stephens, Badminton; Mark E. Pleydell, Wotton-under-Edge, both of United Kingdom

[73] Assignee: Renishaw plc, Gloucestershire, United Kingdom

[21] Appl. No.: 159,549

[22] PCT Filed: Jun. 22, 1987

[86] PCT No.: PCT/GB87/00433

§ 371 Date: Feb. 9, 1988

§ 102(e) Date: Feb. 9, 1988

[87] PCT Pub. No.: WO87/07943

PCT Pub. Date: Dec. 30, 1987

[30] Foreign Application Priority Data

Jun. 21, 1986 [GB] United Kingdom ............... 8615196
Dec. 30, 1986 [GB] United Kingdom ............... 8631035

[51] Int. Cl.$^5$ .................. G06F 15/46; G06F 15/353
[52] U.S. Cl. ........................... 364/577; 364/474.28; 364/560; 364/571.01; 377/17; 73/1 R
[58] Field of Search ............. 364/577, 602, 603, 607, 364/723, 561, 562, 560, 474.28, 167.01, 571.01; 356/372; 324/160, 161; 361/239; 33/1 M, 706; 377/3, 17; 73/1 R

[56] References Cited

U.S. PATENT DOCUMENTS

| | | | |
|---|---|---|---|
| 3,868,680 | 2/1975 | Rhodes | 364/603 |
| 3,976,869 | 8/1976 | Stella et al. | 364/603 |
| 4,346,447 | 8/1982 | Takahama | 364/603 |
| 4,443,788 | 4/1984 | Breslow | 364/603 |
| 4,462,083 | 7/1984 | Schwefel | 364/577 |
| 4,468,745 | 8/1984 | Kjosavik | 364/603 |
| 4,587,622 | 5/1986 | Herzog | 364/561 |
| 4,595,991 | 6/1986 | Spies | 364/525 |
| 4,618,940 | 10/1986 | Schmitt | 364/560 |

FOREIGN PATENT DOCUMENTS

2086039  5/1982  Fed. Rep. of Germany ...... 364/577

*Primary Examiner*—Kevin J. Teska
*Attorney, Agent, or Firm*—Spencer & Frank

[57] ABSTRACT

An apparatus for determining values of a periodic function by interpolation which comprises a reading device for receiving scanning signals A,B,C,D nominally in phase quadrature with each other from the periodic function. The signals are combined in a converter to produce sine and cosine derived signals SN,CS from which interpolation is performed by a computer. Each of the derived signals SN,CS is derived from at least three of the scanning signals A,B,C,D, for example, in the forms 2B-A-D and 2B-A-B.

26 Claims, 5 Drawing Sheets

Fig. 10

INTERPOLATION APPARATUS

BACKGROUND OF THE INVENTION

This invention relates to apparatus for determining values of a periodic function by interpolation.

Known such apparatus comprises reading means for reading at least four values of the periodic function and converting means for converting said at least four values into a pair of derived sine and cosine functions. Interpolation values are determined by establishing the relationship between values of the sine and cosine functions at given intervals.

The reading means is only capable of reading values of the periodic function comforming to a given nominal phase separation, since it will have transducers at a given spacing from each other. Also, the interpolation is only accurate to the extent that the phase difference between the sine and cosine functions is 90°. Disconformity between any actual phase separation and said given phase separation results in departure of said sine and cosine functions from said 90° phase difference and in consequent inaccuracy of the interpolation. For example, such disconformity may arise if the periodicity of the periodic function does not accurately agree with the spacings of the transducers.

In known said apparatus the converting means is adapted for producing said sine and cosine functions each as a function of two said values of the periodic function. For example, if the four values are represented by signals A, B, C and D nominally in quadrature, the sine and cosine functions may be respectively derived by combining these signals as (A–C) and (B–D). This results in substantial dependence of said accuracy on said phase separation.

SUMMARY OF THE INVENTION

In the present invention, the converting means includes means for producing at least one derived signal by combining at least three scanning values or signals. At least in a preferred embodiment, this reduces the dependence of the accuracy of the interpolation on the phase separation.

BRIEF DESCRIPTION OF THE DRAWINGS

Embodiments of apparatus according to this invention will now be described with reference to the accompanying drawings wherein.

DESCRIPTION OF THE PREFERRED EMBODIMENTS

Figure 1:
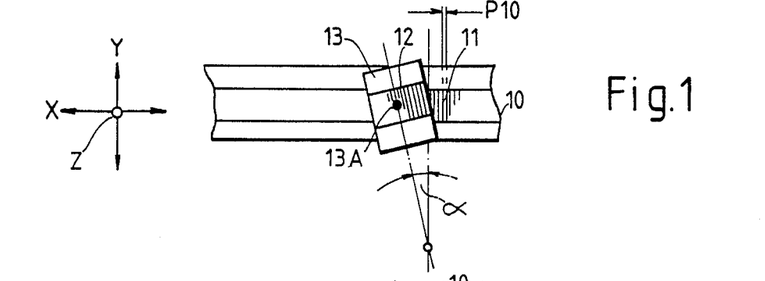
FIG. 1 is an elevation of the mechanical arrangement of a scale-reading apparatus.
Figure 2:
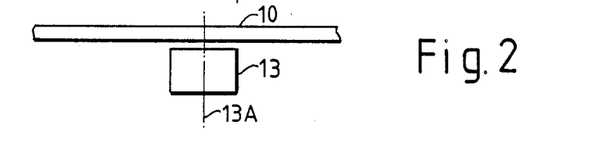
FIG. 2 is a plan view of FIG. 1.
Figure 3:
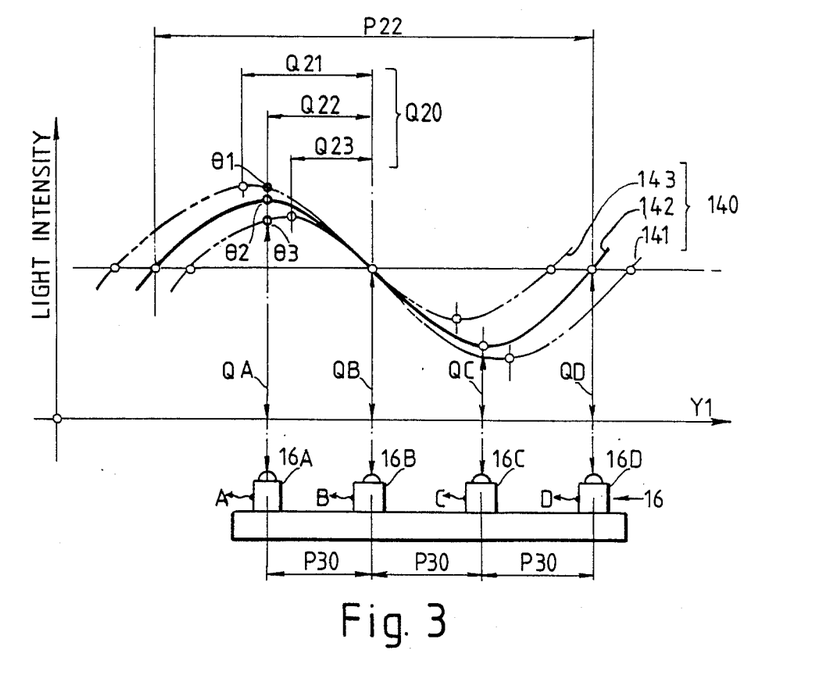
FIG. 3 is a diagram of a periodic light signal and an associated arrangement of light-sensing diodes.

A scale 10 (FIGS. 1,2) having length in a direction X has linear marks 11 extending in a direction Y perpendicular to the direction X. The marks have a spacing P10. A readhead 13 is supported for linear displacement in the direction X. The readhead 13 has an index grating 12 set at an angle $\alpha$ to the scale marks 11 to produce a periodic function having the form of a moire fringe signal 142 (FIG. 3). The signal 142 is defined by a substantially sinusoidally varying light intensity plotted against displacement values Y1 of the moire fringes over the grating 12.

The signal 142 has a period P22, and a corresponding phase separation or quadrature Q22. The period P22 and quadrature Q22 are a function of the angle $\alpha$. The readhead 13 includes a reading means in the form of four transducers or photodiodes 16 or 16A, 16B, 16C, 16D positioned at equal spacings P30 relative to the grating 12 so as to produce four quadrature voltage or scanning signals A, B, C, D corresponding to quadrature light intensity values QA, QB, QC, QD of the signal 142. As described so far the apparatus is well-known.

Figure 4:
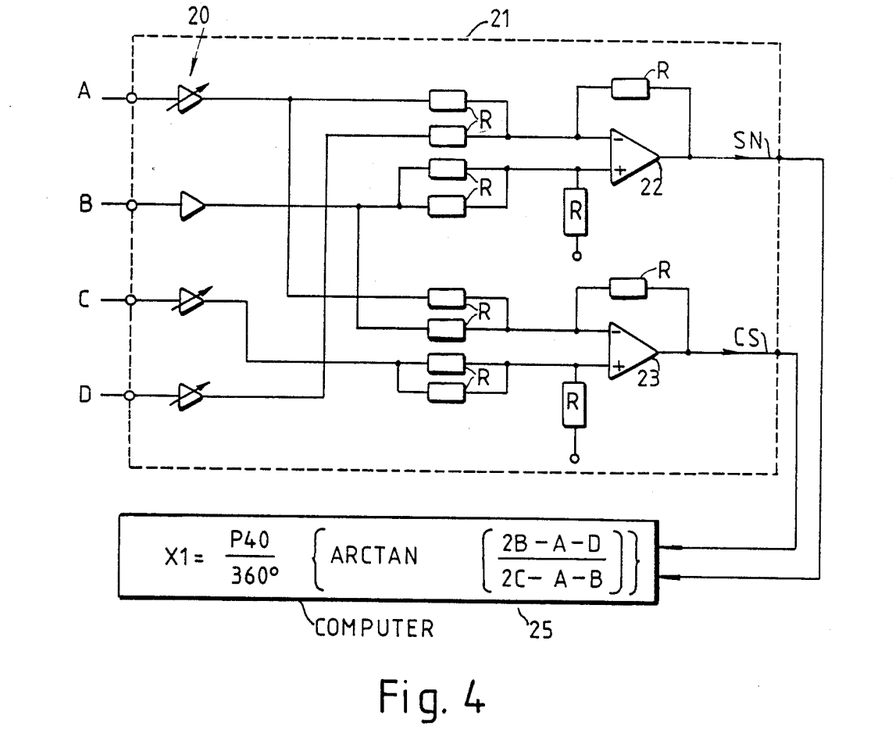
FIG. 4 shows an electrical circuit network in which the outputs of said diodes are combined.

The scanning signals A, B, C, D are connected to a converting means being a circuit network 21 (FIG. 4) wherein the signals A, B, C, D are combined to produce a pair of sine and cosine functions defined by two derived signals SN, CS being sine and cosine derivatives of the signal 142. The network 21 is so arranged that $SN=2B-A-D$ and $CS=2C-A-B$. More specifically, in the network 21, the scanning signals A, B, C, D are at first taken through scaling amplifiers 20, whereafter three of the signals, viz. A, B, D, are taken through an adder-subtractor differential amplifier 22 whose outputs are controlled by resistances, in this embodiment six identical resistances R, such that the amplifier 22 produces the derived signal SN as a voltage having the value $2B-A-D$. The use of such amplifiers for determining a desired value is well-known per se. Another adder-subtractor differential amplifier 23 is organised in the same manner as the amplifier 22 but is connected to the scanning signals A, B, C to produce the derived signal CS as a voltage having the value $2C-A-B$.

Figure 5:
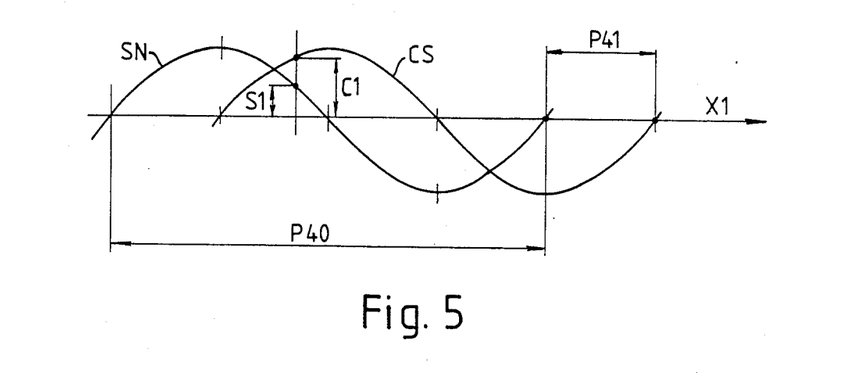
FIG. 5 is a diagram of sine and cosine functions being outputs of said circuit network.

The displacement, denoted X1, of the readhead 13 may be derived from the instantaneous value of the relationship or ratio SN/CS (FIG. 5) and is established by a computer 25 (FIG. 4) to which the derived signals SN, CS are connected. Alternatively, a dedicated circuit may perform the same function, as is well known. The period, P40, of the derived sine and cosine functions corresponds to the spacing P10 of the scale marks and intermediate values such as S1 and C1 are interpolations therebetween. The relationship between the displacement X1 and the values SN, CS is given essentially by the expression:

$$X1 = (P40/360°)[\arctan(SN/CS)] \quad (1)$$

By virtue of the operation of the network 21, this becomes:

$$X1 = (P40/360°)\{\arctan[(2B-A-D)/(2C-A-B)]\} \quad (2)$$

A corresponding expression in conventional apparatus is:

$$X1 = (P40/360°)\{\arctan[(A-C)/(B-D)]\} \quad (3)$$

A feature common to expressions (2) and (3) is that the vector sum of the nominal phases of the scanning signals which are combined to make up the derived signal SN is at ninety degrees to the corresponding vector sum of the nominal phases of the scanning signals which are combined to make up the derived signal CS. This will be explained with reference to the vector diagram, FIG. 7.

Figure 7:
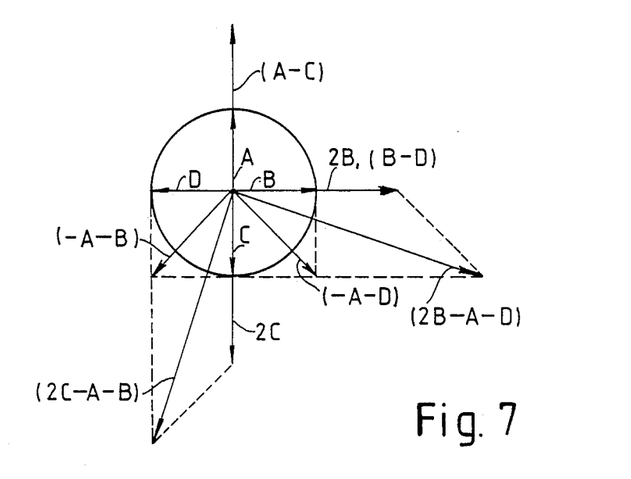
FIG. 7 is a vector diagram illustrating the operation of the circuit network of FIG. 4.

Nominally, the scanning signals A, B, C, D are in quadrature, i.e. their nominal phases have vectors at 90° to each other as shown in FIG. 7. Also shown in FIG. 7 are the vector sums (A-C) and (B-D), which are the combinations making up the derived signals SN and CS in the conventional apparatus (expression (3)). These vector sums are simply parallel to the vectors of the component signals A, B, −C, −D and are therefore also at 90° to each other.

As can also be seen in FIG. 7, the vector sum (2B−A−D) making up the derived signal SN in expression 2 is also at 90° to the vector sum (2C−A−B) making up the derived signal CS. However, the vector sums are no longer parallel to the component vectors. This is a result of producing each of the derived signals by combining three of the scanning signals A, B, C, D, instead of two.

The advantage of producing each of the derived signals SN, CS from at least three of the scanning signals, rather than two, will become apparent from the following description of what happens if the actual phases of the scanning signals A, B, C, D should vary from their nominal phases.

Ideally, the derived signals SN, CS should have a phase difference P41 (FIG. 5) of exactly 90°, but this requires exact conformity between the spacing P30 of the diodes 16 and the phase separation Q22 of the signal 140. As mentioned, the latter separation is a function of the angle $\alpha$. Inasmuch as there are difficulties in setting the angle $\alpha$ with the necessary precision, there are difficulties in establishing said conformity, and this is one reason why the actual phases of the scanning signals A, B, C, D may vary from the nominal phases.

For the purpose of explanation (FIG. 3) it is assumed that angles $\alpha$, different from the exact value, produce signals 141, 143 to either side of the nominal signal 142. The three signals 141, 142, 143 (collectively denoted 140) have corresponding quadratures Q21, Q22, Q23 (collectively denoted Q20) and phase angles $\theta1$, $\theta2$, $\theta3$ (collectively denoted $\theta$). The signal 142 is regarded as a datum signal, inasmuch as the spacing P30 is equivalent to the phase angle $\theta2$, the latter being taken as 90°.

It will be clear that the signal 141 is read by the diodes 16A, 16B at two points defining, for the signal 141, a phase angle $\theta1$ smaller than the angle $\theta2$ and given by the expression $\theta1 = 90° \times Q22/Q21$. At a value for Q21 of 1.125×Q22, $\theta1$ becomes 80°. Correspondingly the signal 143 is read by the diodes 16A, 16B at two points defining, for the signal 143, a phase angle $\theta3$ greater than the angle $\theta2$ and given by the expression $\theta3 = 90° \times Q22/Q23$. At a value for Q23 of 0.69×Q22, $\theta3$ becomes 130°. The apparatus gives good compensation for variations in moire fringe pitch between 1.125 and 0.69 times the pitch of the datum signal 142, as will be become apparent with reference to FIG. 6.

Figure 6:
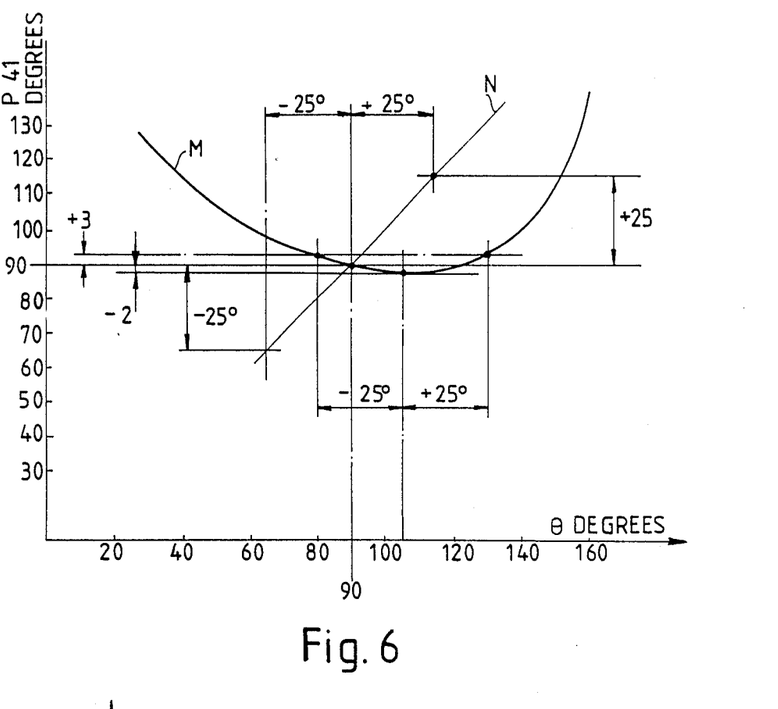
FIG. 6 is a diagram showing the effect of changes in the phase separation of said light signal.

FIG. 6 shows a plot M of the phase difference P41 against the angle $\theta$ when the displacement X1 is established on the basis of expression (2) above. It will be seen that if $\theta$ lies between 80 and 130 degrees the value of P41 varies by between +3 and −2 degrees from the nominal 90°. In other words a variation of $\theta$ over a range of 50° produces a variation in P41 of 5 degrees.

FIG. 6 also shows a plot N of P41 against $\theta$ on the basis of expression (3) above, i.e. using a conventional formulation. It will be seen that N is a straight line at 45° to the abscissa so that a variation of $\theta$ over 50° would produce a variation of P41 also of 50°.

The effect of a change in the angle $\alpha$ is exemplified as follows. A scale 10 having a spacing P10 of 20 micrometers, and an index grating 12 set at an angle $\alpha = 0.35°$ relative to the scale marks 11 produces a moire fringe period P22 of 3.2 mm. In such a case a change in $\alpha$ of ±0.1° produces a calculated change in the fringe period P22 of +1.3 to −0.7 mm and a consequent change in phase angle $\theta$ of about ±25° as shown in FIG. 6. With the conventional network (expression (3)), this produces an interpolation error of about ±2 micrometers. With the use of the network 21, a like change of $\alpha$ produces an interpolation error of about 0.2 micrometer, i.e. about one tenth of that occurring conventionally. Conversely, if an interpolation error of 2 micrometers is acceptable, the tolerance for the angle $\alpha$ may be raised to ±1°.

Using a vector diagram similar to FIG. 7, it will be seen that there are many ways in which three or more of the scanning signals A, B, C, D can be combined to give the derived signals SN, CS having vector sums at 90°. Thus, for example alternative expressions for the distance X1 are:

$$X1 = (P40/360°)\{\arctan[(3B-A-C-D)/(3C-A-B-D)]\} \quad (4)$$

or $$X1 = (P40/360°)\{\arctan[(4B-2D-A-C)/(4C-2A-B-D)]\} \quad (5)$$

It is a characteristic of the expressions (2), (4) and (5) and similar expressions that the sine and cosine terms SN, CS generated by them substantially retain their 90° phase relationship over a useful range substantially larger than that given by conventional interpolation techniques, even if the quadratures Q20 of the optical signal 140 do not conform exactly to the spacing P30 of the diodes 16 used to read the signal 140. It has also been found that the quadrature Q20 may vary relative to the spacing P30 over a range of between 0.2 and 0.36 of the period P22, while still giving results at least as good as with the conventional technique. However, the quadratures Q20 of a given signal 140 have to be equal, as have the spacings P30. Also, the ratios of the amplitudes of the sine and cosine terms SN, CS remain substantially constant over a similar range, which is a factor affecting the accuracy of the interpolation performed by the computer or dedicated circuit 25.

It will be noted that in the expressions (2), (4) and (5), the respective coefficients by which the signals A, B, C, D are multiplied when they are combined to produce the derived signal SN add up to zero. The same is true of the coefficients producing the derived signal CS. For example, referring to expression (2), these coefficients are 2, −1 and −1, both for SN and for CS, while in expression (5) the coefficients are 4, −2, −1 and −1. The sum of the coefficients in each case is zero. This relationship is preferred for the following reason. In any practical embodiment, it is likely that the scanning signals A, B, C, D will each consist of a sinusoidal variation superimposed on an unwanted d.c. offset (e.g. related to the ambient level of illumination of the scale 10 and read head 13, and the reflectivity of the scale, amongst other factors). It will normally be impractical to filter out these d.c. offsets, since that would render it impossible to obtain an output when the scale was stationary relative to the read head. If the coefficients add up to zero in the above manner, however, any d.c. offsets which are common to all the scanning signals will cancel out when these signals are combined.

Nevertheless, the invention is not limited to relationships in which the sum of the coefficients is zero, should such d.c. offsets be insignificant in any given case, or if they are removed in some other manner. Thus, an example in which the sums of the coefficients are not zero would be SN=(B−A−D), CS=(C−A−B).

The above examples have all assumed that there are a total of four scanning signals A, B, C, D all nominally in quadrature with each other. To produce each function SN, CS a combination has been made of at least three, and possibly of all four of these signals. However, it is not essential that there should be four scanning signals nominally in quadrature. Neither is it essential that both derived signals SN, CS be derived from at least three of the scanning signals, since the advantage of the invention can still be observed if only one of them is so derived. An embodiment of the invention will now be described with reference to FIGS. 8 and 9 in order to make this clearer.

Figure 8:
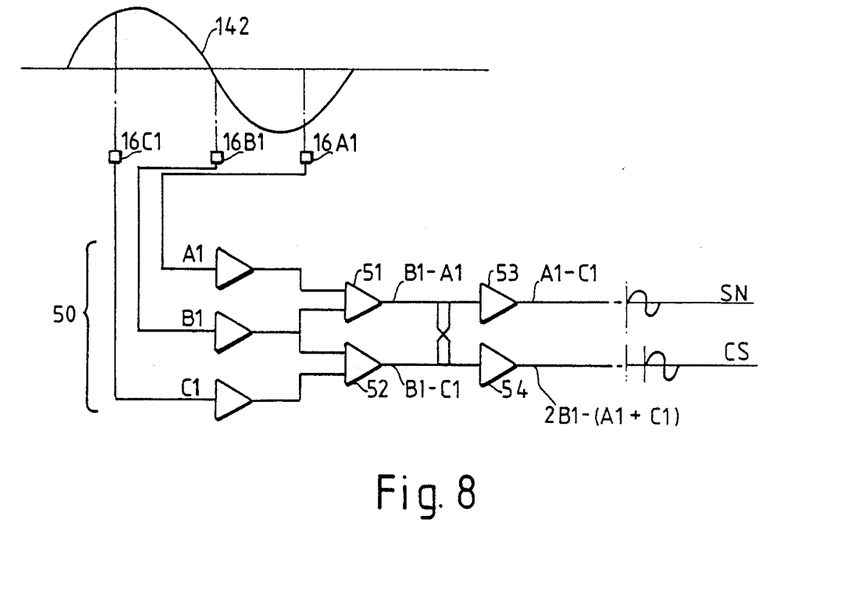
FIG. 8 is a diagram corresponding to FIGS. 3 and 4 but illustrating a modified embodiment.

In FIG. 8, transducers 16A1, 16B1 and 16C1 are arranged nominally at 120° spacings relative to the moire fringe signal 142. This arrangement is described in more detail in our contemporaneously filed international patent application No. W/O87/07944.

The transducers 16A1, 16B1, 16C1 produce respective scanning signals A1, B1, C1 which are connected to a circuit 50 having differential amplifiers 51, 52 for producing signal values B1−A1 and B1−C1, and further differential amplifiers 53, 54 connected to produce signal values A1−C1 and 2B1−(A1+C1) which define respectively the derived sine and cosine signals SN, CS. The amplifiers 51 to 54 are generally similar to the amplifiers 22, 23 of the FIG. 4 embodiment. It will be noted that, as previously, the coefficients by which the scanning signals are multiplied add up to zero, both in the derived signal SN and in the derived signal CS. This means that the derived signals SN, CS are independent of any d.c. offsets which are common to all the scanning signals, e.g. caused by ambient light levels or scale reflectivity.

Figure 9:
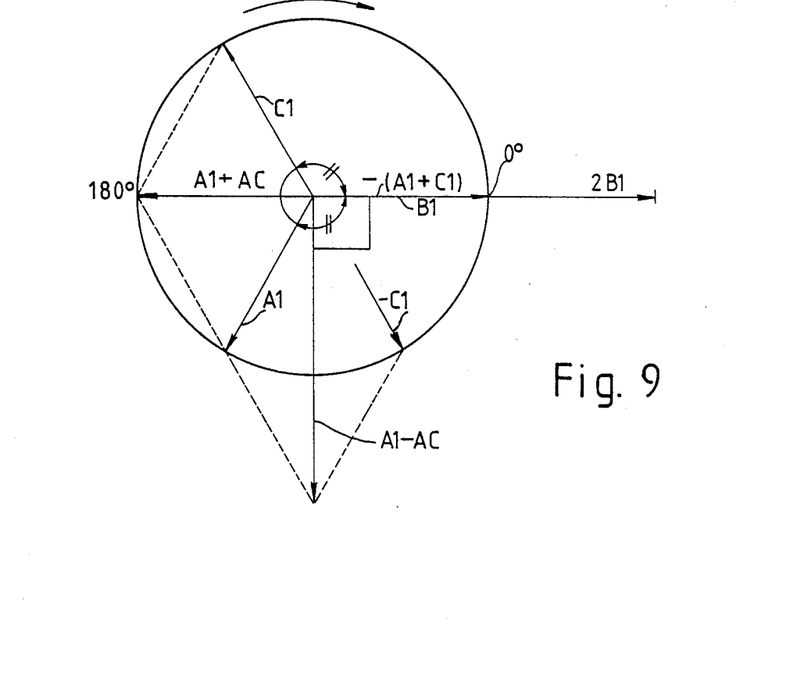
FIG. 9 is a vector diagram illustrating the operation of the embodiment of FIG. 8.

Referring to FIG. 9, the three outputs A1, B1, C1 are shown as vectors. The vectors A1 and C1 respectively lead and trail the vector B1. The vector sum −(A1+C1) has the same nominal phase angle as the vector B1 and occurs between the vectors A1, C1 and the vector sum 2B1−(A1+C1) is shown nominally superimposed on the vector B1. The vector sum A1−C1 occurs between the vectors A1, B1 at an angle of 90° with the vector B1, thus signifying the sine and cosine relationship between the terms 2B1−(A1+C1) and A1−C1. Said 90° relationship is preserved so long as the vectors A1, C1 respectively lead and trail the vector B1 by like amounts, and this relationship is not disturbed (within reasonable limits) by deviations of the absolute values of the phase angles between the vectors A1, C1 and C1, B1 from the nominal 120° separations. In other words, the same advantage accrues as in the previous embodiments, by virtue of the derived signal CS being derived from a combination of all three scanning signals A1, B1, C1. This means in practice that the tolerance to angular misalignment between the scale and the read head about the axis can be greater than would otherwise be the case.

It will be appreciated that the invention is not limited to the use of four scanning signals A, B, C, D nominally in quadrature, or three nominally at 120°. There may be three scanning signals in quadrature, or five or more signals.

Figure 10:
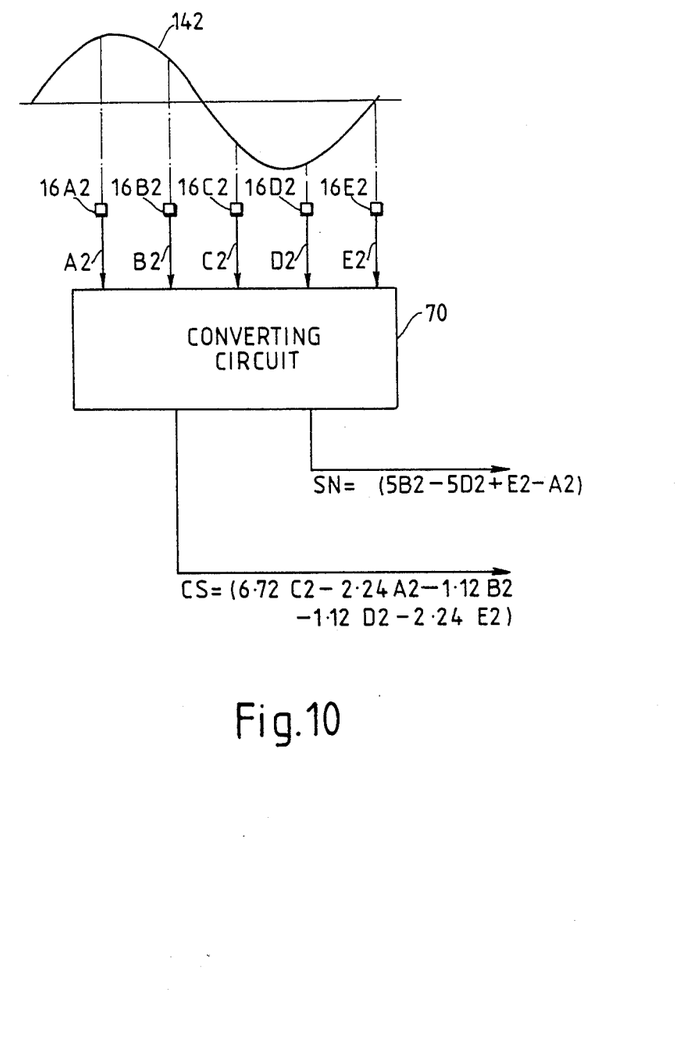
FIG. 10 is another diagram corresponding to FIGS. 3 and 4, illustrating a further modified embodiment.

FIG. 10 illustrates an embodiment in which five transducers 16A2, 16B2, 16C2, 16D2, 16E2 are arranged at nominal phase separations of 72° from each other relative to the moire fringe signal 142. The scanning signals A2, B2, C2, D2, E2 which are produced by the transducers are taken to a converting circuit 70 which combines them to produce the sine and cosine derived signals SN, CS, in the same manner as the circuit 20 in FIG. 4. These are then interpolated by the computer 25 or its equivalent means, as in FIG. 4.

However, in the circuit 70, the coefficients by which the signals are multiplied when combining them have been optimised to keep the phase relationship between the derived signals SN and CS very close to 90° over a very wide range of actual phase separations of the input scanning signals A2, B2, C2, D2, E2. The actual phase separation of the input signals may vary from 5° to 175° while still keeping a substantially 90° phase difference between SN and CS. Also, the coefficients have been optimised to minimise interpolation errors caused by variations in the ratio of the amplitudes of the derived signals SN and CS over that wide range of phase separations. As previously the sums of the coefficients are zero for each derived signal SN, CS.

This optimisation is achieved by multiplying the scanning input signals by the following coefficients to produce the derived signals SN and CS:

|    | A2    | B2    | C2   | D2    | E2    |
|----|-------|-------|------|-------|-------|
| SN | −1.00 | 5.00  | 0.00 | −5.00 | 1.00  |
| CS | −2.24 | −1.12 | 6.72 | −1.12 | −2.24 |

The interpolated value X1 is now given by:

$$X1 = (P40/360°)[\arctan(SN/CS)] \qquad (1)$$

where $$SN = 5.00 \times B2 - 5.00 \times D2 + 1.00 \times E2 - 1.00 \times A2$$

$$CS = 6.72 \times C2 - 2.24 \times A2 - 1.12 \times B2 - 1.12 \times D2 - 2.24 \times E2$$

Although FIG. 10 shows the nominal phase separation of the input signals to be 72°, it will be realised that since this embodiment derives the functions SN and CS accurately over such a wide range of actual phase separations, the transducers can if desired have other nominal phase separations (relative to the moire fringe signal 142). For example, the five transducers (and hence the input signals) may be nominally separated from each other by 60°, or 120°. However, the amplitudes of the derived signals SN, CS decrease as the phase separation of the input scanning signals approaches the limits of the permissible range.

Although the embodiments described have used optical scales and opto-electronic read heads, the invention may be used with other types, e.g. magnetic scales and read heads. Neither need the scale be linear, since the invention can also be used to interpolate measurements of angular or rotary motion.

We claim:

1. Scale reading apparatus for reading a position measuring scale provided with periodic graduations, the apparatus comprising:

reading means for scanning the scale, having four spaced transducers for interacting with the periodic graduations and producing therefrom four respective scanning signals, each of said scanning signals having a predetermined nominal phase and a predetermined nominal phase separation relative to the other of said scanning signals;

converting means for converting said four scanning signals into first and second derived signals, said converting means comprising first combining means for combining a first grouping of said scanning signals to produce the first derived signal, and second combining means for combining a second grouping of said scanning signals, different from the first grouping, to produce the second derived signal, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least three of said scanning signals, the accuracy of said ninety degree phase difference between the derived functions being increased as compared with the accuracy with which the actual phase separations between said scanning signals conform to said predetermined nominal phase separations; and means coupled to said converting means for receiving said first and second derived signals, said means producing an output signal representing position along said scale.

2. Apparatus according to claim 1 wherein said means coupled to said converting means divides said first derived signal by said second derived signal.

3. Apparatus according to claim 1 wherein the converting means includes means for producing each of said derived signals by combining at least three of said scanning signals.

4. Apparatus according to claim 3 wherein the predetermined nominal phase separation of said scanning signals is ninety degrees.

5. Apparatus according to claim 1 wherein the converting means produces each of said derived signals by multiplying a plurality of said scanning signals by respective coefficients and combining them, the sum of said coefficients for each derived signal being zero.

6. Apparatus according to claim 5 wherein the converting means includes means for producing each of said derived signals by combining at least three of said scanning signals.

7. Apparatus according to claim 5 wherein the predetermined nominal phase separation of said scanning signals is ninety degrees.

8. Apparatus according to claim 1 wherein the predetermined nominal phase separation of said scanning signals is ninety degrees.

9. Apparatus according to claim 8 wherein said derived signals are defined respectively by the expression $3B-A-C-D$ and $3C-A-B-D$, wherein A, B, C and D are successive said scanning signals.

10. Apparatus according to claim 8 wherein said derived signals are defined respectively by the expressions $4B-2D-A-C$ and $4C-2A-B-D$, wherein A, B, C and D are successive said scanning signals.

11. Apparatus according to claim 8 wherein said derived signals are defined respectively by the expressions $2B-A-D$ and $2C-A-B$, wherein A, B, C and D are successive said scanning signals.

12. Apparatus according to claim 11 wherein the actual phase separation of said scanning signals lies substantially within the range from 1.125 to 0.69 times said nominal phase separation.

13. Scale reading apparatus for reading a position measuring scale provided with periodic graduations, the apparatus comprising:

reading means for scanning the scale, having three spaced transducers for interacting with the periodic graduations and producing therefrom three respective scanning signals, each of said scanning signals having a predetermined nominal phase and a predetermined nominal phase separation relative to the other of said scanning signals;

converting means for converting said three scanning signals into first and second derived signals, said converting means comprising first combining means for combining a first grouping of said scanning signals to produce the first derived signal, and second combining means for combining a second grouping of said scanning signals, different from the first grouping, to produce the second derived signal, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least two of said scanning signals, the accuracy of said ninety degree phase difference between the derived functions being increased as compared with the accuracy with which the actual phase separations between said scanning signals conform to said predetermined nominal phase separations; and means coupled to said converting means for receiving said first and second derived signals, said means producing an output signal representing position along said scale.

14. Apparatus according to claim 13 wherein said means coupled to said converting means divides said first derived signal by said second derived signal.

15. Apparatus according to claim 13 wherein the predetermined nominal phase separation of said scanning signals is 120 degrees.

16. Apparatus according to claim 15 wherein said derived signals are defined respectively by the expressions $A1-C1$ and $2B1-(A1+C1)$, wherein A1, B1 and C1 are successive said scanning signals.

17. Apparatus according to claim 13 wherein the converting means produces each of said derived signals by multiplying a plurality of said scanning signals by respective coefficients and combining them, the sum of said coefficients for each derived signal being zero.

18. Apparatus according to claim 17 wherein the predetermined nominal phase separation of said scanning signals is 120 degrees.

19. Apparatus according to claim 18 wherein said derived signals are defined respectively by the expressions $A1-C1$ and $2B1-(A1+C1)$, wherein A1, B1 and C1 are successive said scanning signals.

20. Scale reading apparatus for reading a position measuring scale provided with periodic graduations, the apparatus comprising:
  reading means for scanning the scale, having five spaced transducers for interacting with the periodic graduations and producing therefrom five respective scanning signals, each of said scanning signals having a predetermined nominal phase and a predetermined nominal phase separation relative to the other of said scanning signals;
  converting means for converting said five scanning signals into first and second derived signals, said converting means comprising first combining means for combining a first grouping of said scanning signals to produce the first derived signal, and second combining means for combining a second grouping of said scanning signals, different from the first grouping, to produce the second derived signal, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least four of said scanning signals, the accuracy of said ninety degree phase difference between the derived functions being increased as compared with the accuracy with which the actual phase separations between said scanning signals conform to said predetermined nominal phase separations; and
  means coupled to said converting means for receiving said first and second derived signals, said means producing an output signal representing position along said scale.

21. Apparatus according to claim 20 wherein said means coupled to said converting means divides said first derived signal by said second derived signal.

22. Apparatus according to claim 20 wherein the converting means produces each of said derived signals by multiplying a plurality of said scanning signals by respective coefficients and combining them, the sum of said coefficients for each derived signal being zero.

23. Apparatus according to claim 22, wherein the reading means produces five said scanning signals, and said coefficients are substantially as given in the following table, in which A2, B2, C2, D2, E2 are said five scanning signals, and SN and CS are said pair of derived signals:

|    | A2    | B2    | C2   | D2    | E2    |
|----|-------|-------|------|-------|-------|
| SN | −1.00 | 5.00  | 0.00 | −5.00 | 1.00  |
| CS | −2.24 | −1.12 | 6.72 | −1.12 | −2.24 |

24. A method of reading a position measuring scale provided with periodic graduations, said method comprising the steps of:
  scanning said scale with reading means having four spaced transducers for interacting with the periodic graduations and producing therefrom four respective scanning signals, each of said four scanning signals having a predetermined nominal phase and a predetermined nominal phase separation relative to the other of said scanning signals;
  converting said four scanning signals into first and second derived signals, the first derived signal being produced by combining a first grouping of said scanning signals, and the second derived signals being produced by combining a second grouping of said scanning signals, different from the first grouping, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least three of said scanning signals, the accuracy of said ninety degree phase difference between the derived functions being increased as compared with the accuracy with which the actual phase separations between said scanning signals conform to said predetermined nominal phase separations; and
  producing an output representing position along said scale from said first and second derived signals.

25. A method of reading a position measuring scale provided with periodic graduations, said method comprising the steps of:
  scanning said scale with reading means having three spaced transducers for interacting with the periodic graduations and producing therefrom three respective scanning signals, each of said three scanning signals having a predetermined nominal phase and a predetermined nominal phase separation relative to the other of said scanning signals;
  converting said three scanning signals into first and second derived signals, the first derived signal being produced by combining a first grouping of said scanning signals, and the second derived signals being produced by combining a second grouping of said scanning signals, different from the first grouping, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least two of said scanning signals, the accuracy of said ninety degree phase difference between the derived functions being increased as compared with the accuracy with which the actual phase separations between said scanning signals conform to said predetermined nominal phase separations; and
  producing an output representing position along said scale from said first and second derived signals.

26. A method of reading a position measuring scale provided with periodic graduations, said method comprising the steps of:
  scanning said scale with reading means having five spaced transducers for interacting with the periodic graduations and producing therefrom five respective scanning signals, each of said five scanning signals having a predetermined nominal phase and a predetermined nominal phase separation relative to the other of said scanning signals;

converting said five scanning signals into first and second derived signals, the first derived signal being produced by combining a first grouping of said scanning signals, and the second derived signals being produced by combining a second grouping of said scanning signals, different from the first grouping, the nominal phases of the scanning signals which make up the first grouping having a vector sum which is at substantially ninety degrees to the vector sum of the nominal phases of the scanning signals making up the second grouping, whereby the derived signals have a phase difference between them of substantially ninety degrees, at least one of said groupings consisting of at least four of said scanning signals, the accuracy of said ninety degree phase difference between the derived functions being increased as compared with the accuracy with which the actual phase separations between said scanning signals conform to said predetermined nominal phase separations; and producing an output representing position along said scale from said first and second derived signals.

* * * * *